United States Patent
Sarfati et al.

(10) Patent No.: US 7,356,815 B2
(45) Date of Patent: Apr. 8, 2008

(54) INTEGRATED SOFTWARE AND METHOD FOR AUTHENTICATING SAME

(75) Inventors: Jean-Claude Sarfati, Paris (FR); Hervé Chau, Enghien les Bains (FR)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/529,972

(22) PCT Filed: Oct. 2, 2003

(86) PCT No.: PCT/FR03/50073

§ 371 (c)(1),
(2), (4) Date: Dec. 30, 2005

(87) PCT Pub. No.: WO2004/032328

PCT Pub. Date: Apr. 15, 2004

(65) Prior Publication Data

US 2006/0156000 A1    Jul. 13, 2006

(30) Foreign Application Priority Data

Oct. 4, 2002    (FR) .................................. 02 12325

(51) Int. Cl.
*G06F 9/44* (2006.01)

(52) U.S. Cl. .................. 717/168; 713/176; 713/164; 709/229

(58) Field of Classification Search .................... None
See application file for complete search history.

(56) References Cited

U.S. PATENT DOCUMENTS 6,675,201 B1 * 1/2004 Parkkinen ............... 709/216
6,901,518 B1 * 5/2005 Scheifler et al. .............. 726/12

FOREIGN PATENT DOCUMENTS

| EP | 0 770 957 A2 | 5/1997 |
| EP | 1 033 652 A2 | 9/2000 |
| WO | WO-00/64178 A1 | 10/2000 |
| WO | WO-02/061557 A2 | 8/2002 |

* cited by examiner

*Primary Examiner*—Wei Zhen
*Assistant Examiner*—Phillip H Nguyen
(74) *Attorney, Agent, or Firm*—Osha Liang LLP

(57) ABSTRACT

The invention concerns a method for authenticating a software downloaded in a terminal, comprising the following steps: authenticating by certificate said downloaded software by means of a software integrated in said terminal; authenticating by certificate, during execution of said downloaded software, said integrated software by means of an authenticating software module associated with said downloaded software.

6 Claims, 2 Drawing Sheets

INTEGRATED SOFTWARE AND METHOD FOR AUTHENTICATING SAME

BACKGROUND OF THE INVENTION

The invention relates to integrated software and a method of authenticating the latter, in particular in the field of digital television decoders.

DESCRIPTION OF THE PRIOR ART

In the devices of the prior art, an integrity test of integrated software is normally performed by computing, using an external tool, a reference signature of this software representative of the latter and by inserting the latter into this software. During the software initialization phase, the software computes its own signature and compares this signature with the reference signature. If these signatures are different, the software executes a software routine specific to a defense procedure, otherwise it continues normally.

In the case of an authentication of such software, it is desirable to check the source of the latter. A known solution consists in applying the principle of the integrity test and combining it with an asymmetrical cryptographic algorithm: the reference signature is encrypted with a private key and the result is integrated, in the form of a certificate, in the software. During the checking phase, the reference signature is decrypted with a public key incorporated in the software before being compared to the reference signature.

A first document of the prior art, ETSI standard TS 101 812 V1-1-1 entitled "Digital Video Broadcasting (DVB) Multimedia Home Platform (MHP) Specification 1.0" (2000-07), in particular sections 12.2 and 12.7, describes the implementation of a method of authenticating software downloaded into a terminal by carrying out an authentication by certificate of said downloaded software by means of software integrated in said terminal.

A second document of the prior art, U.S. Pat. No. 6,167,521, describes a method of downloading new software into a system, the purpose of which is to prevent this new downloaded software from attacking software already installed in this system, or, conversely, to prevent the software already installed from attacking the new software, in particular when the respective software owners do not have confidence in each other.

More specifically, to perform a software authentication, the use of software contained in a memory in a first fixed, that is, write-protected, part 10 to authenticate application software of a second part 11, which may have been downloaded, using a certificate 12 located in this second part 11, is known, as illustrated in FIG. 1.

Thus, in the decoder field, when a customer seeks out the service provider with new application software, the latter provides him with software for verifying this application software and a certificate to be associated with said application software.

However, in such a solution, there is no way for the provider of the first software to check that the authentication procedure has indeed taken place.

The object of the invention is to enable the provider to check that this authentication has indeed taken place and that his rights have therefore indeed been respected by the customer.

SUMMARY OF THE INVENTION

The present invention therefore proposes a method for authenticating software downloaded in a terminal, said method comprising a step for authenticating by certificate said downloaded software by means of software integrated in said terminal, characterized in that it also comprises a step for authenticating by certificate, during execution of said downloaded software, said first integrated software by means of an authentication software module associated with said downloaded software.

Advantageously, the first integrated software authenticates the downloaded software by means of an authentication library and a first certificate; the first integrated software and the authentication library form a first part of write-protected memory, the downloaded software and this first certificate form a second part of loadable memory.

Advantageously, the first part also includes a second certificate, the second part also includes verification software, and, once the downloaded software has been authenticated, the verification software authenticates the first software by means of the authentication library and the second certificate.

Advantageously, these two successive authentications take place on initialization. The second part can be downloaded.

The invention also relates to integrated software comprising a first write-protected memory part formed from first software and an authentication library, and a second part including application software and a first certificate, characterized in that the first part also includes a second certificate, and in that the second part also includes verification software.

This software can be used, for example, in a digital television decoder, in a PC (personal computer) type terminal, or in any other integrated device.

DETAILED DESCRIPTION OF THE PREFERRED EMBODIMENTS

Figure 1:
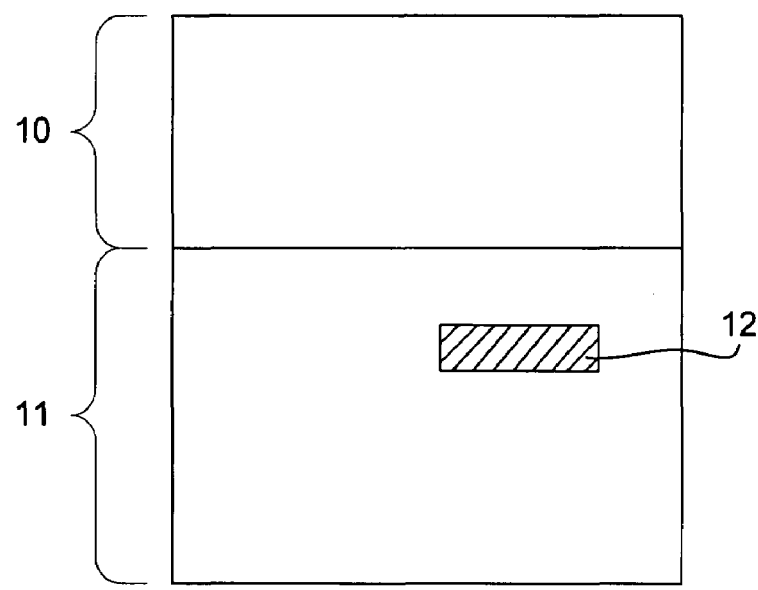
FIG. 1 illustrates an authentication method of the prior art.

In the method of the invention, as in the method of the prior art illustrated in FIG. 1, first software contained in a first part 10 of write-protected memory authenticates, for example in the initialization phase, second software, which is the application software, located in a second loadable part 11 using an authentication library located in the first part and a certificate 12 located in this second part 11.

Since the term "certificate" has a quite particular meaning (an electronic identity which is issued by a trusted third party for a person or a network entity, each certificate being signed with the private signature key of a certification authority) and is too limiting in the authentication techniques, the term "certificate" used in the present description is meant to cover also, more generally, the terms signature, CRC or other data required to verify the authenticity/integrity of software.

Figure 2:
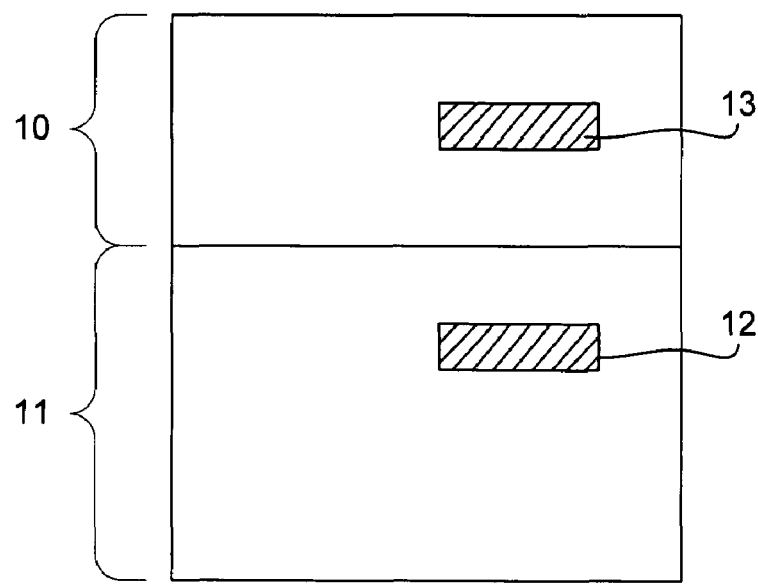
FIG. 2 illustrates the authentication method of the invention.

In the method of the invention, the first part 10 also includes a second certificate 13, as illustrated in FIG. 2. The second part 11 also includes verification software. This verification software, once the application software has been authenticated, authenticates the first software by means of the authentication library and the second certificate.

Such a method enables the supplier of the first software to check that the customer using the application software does indeed respect his rights.

Figure 3:
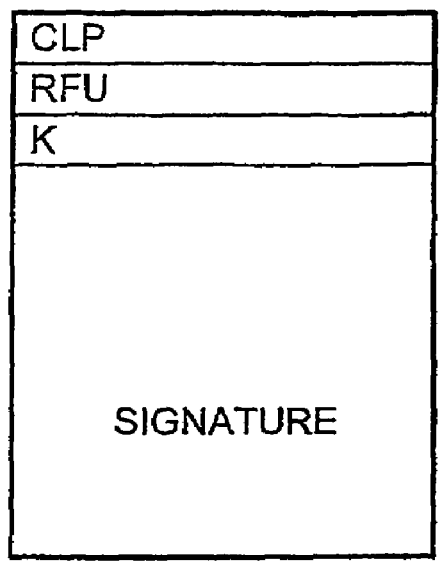
FIG. 3 illustrates an example of a certificate.
Figure 4:
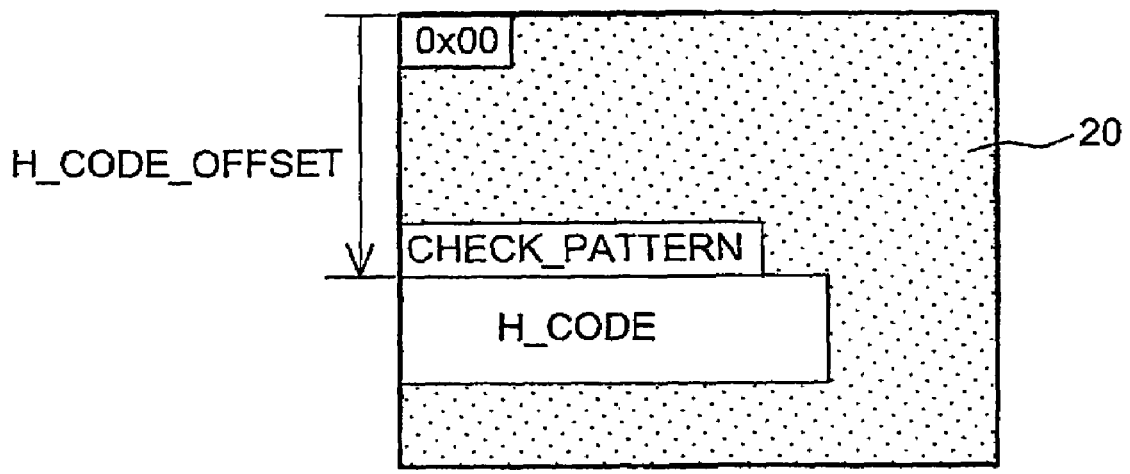
FIG. 4 illustrates an example of signature.

In an exemplary embodiment, the format of the certificate, illustrated in FIG. 3, is as follows:

Header:
  CLP ("Certificate Location Pattern"): pattern giving the location of the certificate to find the authentication certificate in the memory (for example, 8 bytes),
  RFU ("Reserved for Future Use"): reserved for a future use (for example 1 byte),
  K: key number to be used (for example, 1 byte),
  Signature (for example, 128 bytes) which is the result of an RSA encryption, with a private key, of 1024 bits of the message illustrated in FIG. 4.

The 1024-bit signature begins with a byte at 0 to enable its RSA encryption, the rest 20 is filled randomly in a different way before each encryption.

At the offset H_CODE_OFFSET from the start of the message, there is a hash code SHA1 on 20 bytes. This H_CODE is preceded by a CHECK_PATTERN pattern, the function of which is to enable distinction between a wrong decryption (public key number or value, algorithm, inconsistent certificate) and a wrong H_CODE during the integrity check.

The invention claimed is:

1. A method for authenticating software downloaded in a terminal, said method comprising:
  Authenticating, by a first certificate, said downloaded software using a first integrated software in said terminal;
  Authenticating said first integrated software using an authentication software module associated with said downloaded software during execution of said downloaded software, wherein said first integrated software is authenticated using a second certificate;
  Wherein the first integrated software authenticates the downloaded software using an authentication library and the first certificate, wherein the first integrated software and the authentication library form a first part of write-protected memory, and wherein the downloaded software and the first certificated form a second part of loadable memory; and
  Wherein the first part of the write-protected memory further comprises the second certificate, wherein the second part of loadable memory further comprises verification software, and wherein, once the downloaded software has been authenticated, the verification software authenticates the first integrated software using the authentication library and the second certificate.

2. The method as claimed in claim 1, wherein the successive authentications take place on initialization.

3. The method as claimed in claim 1, wherein content stored in the second part of loadable memory is downloaded.

4. A computer system, comprising:
  A processor; and
  A memory comprising a first part and a second part, wherein the first part is write-protected and the second part is loadable memory,
  Wherein the first part comprises a first integrated software, an authentication library, and a second certificate,
  Wherein the second part comprises downloaded application software, a first certificate, and a verification software,
  Wherein the computer system further comprises integrated software instructions that, when executed by the processor, are configured to:
  Authenticate, by the first certificate, said downloaded application software using the first integrated software;
  Authenticate said first integrated software using an authentication software module associated with said downloaded application software during execution of said downloaded application software, wherein said first integrated software is authenticated using a second certificate;
  Wherein the first integrated software authenticates the downloaded application software using the authentication library and the first certificate; and
  Wherein, once the downloaded application software has been authenticated, the verification software authenticates the first integrated software using the authentication library and the second certificate.

5. The computer system of claim 4, wherein the successive authentications take place upon initialization.

6. The computer system of claim 4, wherein content stored in the second part of loadable memory is downloaded.

* * * * *

UNITED STATES PATENT AND TRADEMARK OFFICE
CERTIFICATE OF CORRECTION

| | | |
|---|---|---|
| PATENT NO. | : 7,356,815 B2 | Page 1 of 1 |
| APPLICATION NO. | : 10/529972 | |
| DATED | : April 8, 2008 | |
| INVENTOR(S) | : Jean-Claude Sarfati et al. | |

It is certified that error appears in the above-identified patent and that said Letters Patent is hereby corrected as shown below:

On the Title Page:

On the Title Page, section (75) Inventors, line one, "Jean-Claude Sarfati, Paris (FR)" should be --Jean-Claude Sarfati, Enghien les Bains (FR)--.

On the Title Page, section (75) Inventors, line two, "Herve Chau, Enghien les Bains (FR)" should be --Herve Chau, Paris (FR)--.

Signed and Sealed this

Twenty-ninth Day of July, 2008

JON W. DUDAS
*Director of the United States Patent and Trademark Office*